United States Patent
Inoue et al.

(10) Patent No.: US 10,669,405 B2
(45) Date of Patent: Jun. 2, 2020

(54) RUBBER COMPOSITION FOR TIRES AND PNEUMATIC TIRE

(71) Applicant: SUMITOMO RUBBER INDUSTRIES, LTD., Kobe-shi, Hyogo (JP)

(72) Inventors: Satoru Inoue, Kobe (JP); Norihiro Matsumoto, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/944,264

(22) Filed: Apr. 3, 2018

(65) Prior Publication Data

US 2018/0312670 A1    Nov. 1, 2018

(30) Foreign Application Priority Data

May 1, 2017    (JP) .................................. 2017-091239

(51) Int. Cl.
| | |
|---|---|
| *C08L 9/00* | (2006.01) |
| *B60C 1/00* | (2006.01) |
| *C08L 7/00* | (2006.01) |

(52) U.S. Cl.
CPC .............. *C08L 9/00* (2013.01); *B60C 1/0016* (2013.01); *C08L 7/00* (2013.01); *C08L 2205/02* (2013.01); *C08L 2205/025* (2013.01); *C08L 2205/03* (2013.01); *C08L 2205/06* (2013.01)

(58) Field of Classification Search
CPC . B60C 1/0016; C08L 7/00; C08L 9/00; C08L 2205/025; C08L 2205/03; C08L 2205/06; C08L 2205/02
USPC ........................................................ 523/156
See application file for complete search history.

(56) References Cited

U.S. PATENT DOCUMENTS

2016/0177072 A1 *  6/2016  Miyazaki .................. B60C 1/00
                                                                524/254

FOREIGN PATENT DOCUMENTS

WO    WO-2015001935 A1 *  1/2015   ............... B60C 1/00

* cited by examiner

*Primary Examiner* — Angela C Scott
(74) *Attorney, Agent, or Firm* — Birch, Stewart, Kolasch & Birch, LLP

(57) ABSTRACT

The present invention provides a rubber composition for tires which provides a balanced improvement of physical properties including fuel economy, tensile strength, and abrasion resistance while achieving good processability. Also provided is a pneumatic tire formed from the rubber composition. The rubber composition for tires contains: an isoprene-based rubber; and a polybutadiene rubber mixture consisting of a high molecular weight polybutadiene rubber having a cis content of 95% by mass or more and a peak top molecular weight Mp of 550,000 or more and a low molecular weight polybutadiene rubber having a cis content of 95% by mass or more and a peak top molecular weight Mp of 500,000 or less. The rubber component in the rubber composition includes, based on 100% by mass thereof, 60 to 90% by mass of the isoprene-based rubber and 10 to 40% by mass of the polybutadiene rubber mixture.

5 Claims, No Drawings

RUBBER COMPOSITION FOR TIRES AND PNEUMATIC TIRE

TECHNICAL FIELD

The present invention relates to a rubber composition for tires and a pneumatic tire.

BACKGROUND ART

With the recent increase in demand for safe and fuel efficient cars, a need exists for tire rubber materials which simultaneously provide improved properties including mechanical properties, abrasion resistance, and fuel economy. Several techniques have been proposed to solve this challenge, such as use of diene polymers with low heat build-up properties, use of silica as filler for reducing heat build-up, use of fine particle carbon black having high reinforcing properties and excellent abrasion resistance, and combinations of these techniques.

For example, it is contemplated that the fuel economy and abrasion resistance of rubber compositions may be further improved by combining a rubber component having an increased molecular weight with filler to increase their affinity. However, since rubber components with an increased molecular weight usually have poor processability, simply combining those components will result in deterioration of processability of the rubber composition due to its increased viscosity. This can cause silica or fine particle carbon black to have poor dispersibility, and it is therefore difficult to achieve a good balance of sufficient properties.

SUMMARY OF INVENTION

Technical Problem

The present invention aims to solve the above problems and provide a rubber composition for tires which provides a balanced improvement of physical properties including fuel economy, tensile strength, and abrasion resistance while achieving good processability. Another object of the present invention is to provide a pneumatic tire formed from the rubber composition.

Solution to Problem

The present invention relates to a rubber composition for tires, containing: an isoprene-based rubber; and a polybutadiene rubber mixture consisting of a high molecular weight polybutadiene rubber having a cis content of 95% by mass or more and a peak top molecular weight Mp of 550,000 or more and a low molecular weight polybutadiene rubber having a cis content of 95% by mass or more and a peak top molecular weight Mp of 500,000 or less, a rubber component in the rubber composition including, based on 100% by mass thereof, 60 to 90% by mass of the isoprene-based rubber and 10 to 40% by mass of the polybutadiene rubber mixture.

The rubber composition preferably contains 20 to 80 parts by mass of carbon black per 100 parts by mass of the rubber component.

Another aspect of the present invention relates to a pneumatic tire, including a tread formed from the rubber composition.

Advantageous Effects of Invention

The rubber composition for tires of the present invention contains an isoprene-based rubber, and a polybutadiene rubber mixture consisting of a high molecular weight polybutadiene rubber having a cis content of 95% by mass or more and a peak top molecular weight Mp of 550,000 or more and a low molecular weight polybutadiene rubber having a cis content of 95% by mass or more and a peak top molecular weight Mp of 500,000 or less. The rubber component in the rubber composition includes, based on 100% by mass thereof, 60 to 90% by mass of the isoprene-based rubber and 10 to 40% by mass of the polybutadiene rubber mixture. Such a rubber composition provides a balanced improvement of physical properties including fuel economy, tensile strength, and abrasion resistance while achieving good processability.

DESCRIPTION OF EMBODIMENTS

The rubber composition for tires of the present invention contains predetermined amounts of an isoprene-based rubber and a polybutadiene rubber mixture consisting of a specific high cis, high molecular weight polybutadiene rubber and a specific high cis, low molecular weight polybutadiene rubber.

A common way to improve abrasion resistance or fuel economy is to use high molecular weight BR (Iwakazu Hattori and Toshihiro Tadaki, Improvement of Abrasion Resistance of Polydienes, Journal of The Society of Rubber Science and Technology, Japan, vol. 80, No. 4, 2007, pp. 140-146, which is incorporated herein by reference). However, the use of high molecular weight BR disadvantageously causes a deterioration in processability, e.g. viscosity ($ML_{1+4}$). Therefore, at present, BR having a peak top molecular weight Mp of 500,000 or less is used alone to ensure processability.

The present invention uses a composition that includes a rubber component including an isoprene-based rubber and polybutadiene rubber in which the polybutadiene rubber component particularly includes a polybutadiene rubber mixture consisting of a specific high cis, high molecular weight polybutadiene rubber and a specific high cis, low molecular weight polybutadiene rubber to sufficiently exploit the potentials of the materials, thereby simultaneously achieving or even improving physical properties including fuel economy, tensile strength, and abrasion resistance.

The mechanism of this effect is not fully clear, but it is assumed that: the use of a low molecular weight polybutadiene rubber having a high cis content and a peak top molecular weight Mp of 500,000 or less provides good processability to ensure filler dispersibility; further, by using a high molecular weight polybutadiene rubber having a high cis content and a peak top molecular weight Mp of 550,000 or more in such a composition, the potential of the rubber can be sufficiently exploited, thereby resulting in a balanced improvement of physical properties including fuel economy, tensile strength, and abrasion resistance.

Thus, according to the present invention, it is possible to sufficiently exploit the properties of materials (e.g. high molecular weight polybutadiene rubber) whose potentials cannot be exploited using conventional techniques because they cannot be sufficiently kneaded due to the reduced processability. Thus, it is possible to significantly (synergistically) improve the balance of physical properties including fuel economy, tensile strength, and abrasion resistance while achieving good processability.

Examples of the isoprene-based rubber include natural rubber (NR), polyisoprene rubber (IR), refined NR, modified NR, and modified IR. The NR and IR may be those commonly used in the tire industry, such as SIR20, RSS #3, or TSR20 for the NR, and IR2200 for the IR. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These rubbers may be used alone, or two or more of these may be used in combination.

The lower limit of the amount of the isoprene-based rubber based on 100% by mass of the rubber component is 60% by mass or more, preferably 70% by mass or more, while the upper limit is 90% by mass or less, preferably 80% by mass or less. When the amount is adjusted within the range indicated above, a balanced improvement of physical properties including fuel economy, tensile strength, and abrasion resistance can be achieved.

The rubber composition contains a polybutadiene rubber mixture consisting of a high molecular weight polybutadiene rubber having a cis content of 95% by mass or more and a peak top molecular weight Mp of 550,000 or more and a low molecular weight polybutadiene rubber having a cis content of 95% by mass or more and a peak top molecular weight Mp of 500,000 or less.

In view of the balance of fuel economy, tensile strength, and abrasion resistance, the high molecular weight BR (high molecular weight polybutadiene rubber) has a peak top molecular weight Mp of 550,000 or more, preferably 650,000 or more, more preferably 700,000 or more. The upper limit of the peak top molecular weight Mp is not particularly critical, but is preferably 1,000,000 or less, more preferably 900,000 or less, in view of processability.

The high molecular weight BR preferably has a molecular weight distribution [Mw (weight average molecular weight)/Mn (number average molecular weight)] of 2.0 or more, more preferably 2.2 or more, in view of processability. The Mw/Mn is preferably 4.0 or less, more preferably 3.5 or less, in view of the balance of fuel economy, tensile strength, and abrasion resistance.

The low molecular weight BR (low molecular weight polybutadiene rubber) has a peak top molecular weight Mp of 500,000 or less, preferably 470,000 or less, more preferably 450,000 or less, in view of processability. The lower limit of the peak top molecular weight Mp is not particularly critical, but is preferably 300,000 or more, more preferably 350,000 or more, in view of the balance of fuel economy, tensile strength, and abrasion resistance.

The low molecular weight BR preferably has a molecular weight distribution [Mw (weight average molecular weight)/Mn (number average molecular weight)] of 2.0 or more, more preferably 2.2 or more, in view of processability. The Mw/Mn is preferably 4.0 or less, more preferably 3.5 or less, in view of the balance of fuel economy, tensile strength, and abrasion resistance.

The Mp, Mw, and Mn of the high molecular weight BR, low molecular weight BR, and other polymers can be measured as described later in EXAMPLES.

The high molecular weight BR and low molecular weight BR each have a cis content of 95% by mass or more, preferably 97% by mass or more, to improve abrasion resistance.

The cis content may be measured by infrared absorption spectrometry.

The high molecular weight BR and low molecular weight BR may each be any BR having the above-defined high cis content and Mp. The BR may be an unmodified BR or modified BR. It may be a commercial product available from, for example, Ube Industries, Ltd., JSR Corporation, Asahi Kasei Corporation, or Zeon Corporation. The high molecular weight BR and low molecular weight BR may each be a single material or a combination of two or more materials.

The lower limit of the amount of the polybutadiene rubber mixture (BR mixture) (the combined amount of the high molecular weight BR and low molecular weight BR) based on 100% by mass of the rubber component is 10% by mass or more, preferably 20% by mass or more, while the upper limit is 40% by mass or less, preferably 30% by mass or less. When the amount is adjusted within the range indicated above, a balanced improvement of physical properties including fuel economy, tensile strength, and abrasion resistance can be achieved.

The amount of the high molecular weight BR based on 100% by mass of the rubber component is preferably 5% by mass or more, more preferably 10% by mass or more, in view of physical properties including fuel economy, tensile strength, and abrasion resistance. The amount is preferably 30% by mass or less, more preferably 20% by mass or less, in view of processability.

The amount of the low molecular weight BR based on 100% by mass of the rubber component is preferably 5% by mass or more, more preferably 10% by mass or more, in view of processability. The amount is preferably 30% by mass or less, more preferably 20% by mass or less, in view of physical properties including fuel economy, tensile strength, and abrasion resistance.

Examples of rubbers other than isoprene-based rubbers, high molecular weight BR, and low molecular weight BR that may be used in the rubber component include diene rubbers such as other types of BR, styrene-butadiene rubber (SBR), acrylonitrile butadiene rubber (NBR), chloroprene rubber (CR), butyl rubber (IIR), and styrene-isoprene-butadiene copolymer rubber (SIBR).

The rubber composition preferably contains carbon black in view of the balance of the properties.

The amount of carbon black per 100 parts by mass of the rubber component is preferably 5 parts by mass or more, more preferably 20 parts by mass or more, still more preferably 35 parts by mass or more. An amount of not less than the lower limit tends to provide sufficient reinforcing properties, thereby resulting in good abrasion resistance. The amount is also preferably 100 parts by mass or less, more preferably 80 parts by mass or less. An amount of not more than the upper limit tends to lead to good rolling resistance properties.

In view of abrasion resistance and other properties, the carbon black preferably has a nitrogen adsorption specific surface area ($N_2SA$) of 80 $m^2/g$ or more, more preferably 100 $m^2/g$ or more. In view of dispersibility of carbon black, fuel economy, and other properties, the $N_2SA$ is preferably 200 $m^2/g$ or less, more preferably 150 $m^2/g$ or less.

The $N_2SA$ of the carbon black may be determined in accordance with JIS K 6217-2:2001.

Non-limiting examples of the carbon black include N134, N110, N220, N234, N219, N339, N330, N326, N351, N550, and N762. The carbon black may be a commercial product available from, for example, Asahi Carbon Co., Ltd., Cabot Japan K.K., Tokai Carbon Co., Ltd., Mitsubishi Chemical Corporation, Lion Corporation, NSCC Carbon Co., Ltd, or Columbia Carbon.

The rubber composition may contain silica. Examples of the silica include dry silica (anhydrous silica) and wet silica (hydrous silica). Among these, wet silica is preferred because it contains a large number of silanol groups.

The amount of silica per 100 parts by mass of the rubber component is preferably 80 parts by mass or less, more preferably 30 parts by mass or less, still more preferably 20 parts by mass or less, in view of processability and other properties. The silica is preferably present in an amount of 5 parts by mass or more per 100 parts by mass of the rubber component.

The silica preferably has a nitrogen adsorption specific surface area ($N_2SA$) of 80 $m^2/g$ or more, more preferably 100 $m^2/g$ or more. A $N_2SA$ of not less than the lower limit tends to provide a good reinforcing effect, thereby resulting in excellent properties including tensile strength and abrasion resistance. The $N_2SA$ of the silica is also preferably 300 $m^2/g$ or less, more preferably 200 $m^2/g$ or less. A $N_2SA$ of not more than the upper limit tends to lead to good dispersibility.

The $N_2SA$ of the silica is measured by the BET method in accordance with ASTM D3037-93.

The silica may be a product of, for example, Degussa, Rhodia, Tosoh Silica Corporation, Solvay Japan, or Tokuyama Corporation.

In the rubber composition, the combined amount of carbon black and silica per 100 parts by mass of the rubber component is preferably 20 parts by mass or more, more preferably 50 parts by mass or more, but is preferably 150 parts by mass or less, more preferably 100 parts by mass or less, still more preferably 80 parts by mass or less. When it is within the range indicated above, good abrasion resistance and excellent fuel economy can be simultaneously obtained, and the effects of the present invention can be sufficiently achieved.

In the case where the rubber composition contains silica, it preferably contains a silane coupling agent.

Non-limiting examples of the silane coupling agent include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane.

The silane coupling agent may be a product of, for example, Degussa, Momentive, Shin-Etsu Silicone, Tokyo Chemical Industry Co., Ltd., AZmax. Co., or Dow Corning Toray Co., Ltd.

The amount of the silane coupling agent per 100 parts by mass of silica is preferably 3 parts by mass or more, more preferably 5 parts by mass or more. An amount of 3 parts by mass or more tends to provide the addition effect. The amount is also preferably 20 parts by mass or less, more preferably 15 parts by mass or less. An amount of not more than 20 parts by mass tends to lead to an effect commensurate with the added amount, as well as good processability during kneading.

The rubber composition may contain organic or inorganic fillers other than carbon black and silica. Examples of the inorganic fillers include talc, aluminum hydroxide, aluminum oxide, magnesium hydroxide, magnesium oxide, magnesium sulfate, titanium white, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, silicon carbide, zirconium, and zirconium oxide. Examples of the organic fillers include cellulose nanofibers.

The rubber composition may contain an oil and/or a liquid diene polymer.

The oil may be, for example, a process oil, vegetable fat or oil, or a mixture thereof. Examples of the process oil include paraffinic process oils, aromatic process oils, and naphthenic process oils. Examples of the vegetable fat or oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil.

The oil may be a product of, for example, Idemitsu Kosan Co., Ltd., Sankyo Yuka Kogyo K.K., JX Nippon Oil & Energy Corporation, Olisoy, H&R, Hokoku Corporation, Showa Shell Sekiyu K.K., or Fuji Kosan Co., Ltd.

The term "liquid diene polymer" refers to a diene polymer that is in the liquid state at room temperature (25° C.). The liquid diene polymer preferably has a polystyrene-equivalent weight average molecular weight (Mw) of $1.0 \times 10^3$ to $2.0 \times 10^5$, more preferably $3.0 \times 10^3$ to $1.5 \times 10^4$, as determined by gel permeation chromatography (GPC). Examples of the liquid diene polymer include liquid styrene-butadiene copolymers, liquid polybutadiene polymers, liquid polyisoprene polymers, and liquid styrene-isoprene copolymers.

In the rubber composition, the combined amount of the oil and the liquid diene polymer per 100 parts by mass of the rubber component is preferably 5 parts by mass or less, more preferably 2 parts by mass or less, in view of tensile strength, abrasion resistance, fuel economy, and other properties. It may be 0 parts by mass.

The rubber composition may contain a wax.

Non-limiting examples of the wax include petroleum waxes such as paraffin wax and microcrystalline wax; naturally-occurring waxes such as plant and animal waxes; and synthetic waxes such as polymers of ethylene, propylene, or the like. Among these, petroleum waxes are preferred, with paraffin wax being more preferred.

The amount of the wax per 100 parts by mass of the rubber component is preferably 0.3 to 20 parts by mass, more preferably 0.5 to 10 parts by mass, in view of the balance of the properties.

The wax may be a product of, for example, Ouchi Shinko Chemical Industrial Co., Ltd., Nippon Seiro Co., Ltd., or Seiko Chemical Co., Ltd.

The rubber composition preferably contains an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol, and styrenated phenol; and bis-, tris-, or polyphenolic antioxidants such as tetrakis-[methylene-3-(3',5'-di-t-butyl-4'-hydroxyphenyl)-propionate]methane. Among these, p-phenylenediamine antioxidants or quinoline antioxidants are preferred, with N-(1,3-dimethylbutyl)-N'-phenyl-p-phenylenediamine or 2,2,4-trimethyl-1,2-dihydroquinoline polymer being more preferred.

The amount of the antioxidant per 100 parts by mass of the rubber component is preferably 0.3 to 10 parts by mass, more preferably 0.5 to 7 parts by mass, in view of the balance of the properties.

The antioxidant may be a product of, for example, Seiko Chemical Co., Ltd., Sumitomo Chemical Co., Ltd., Ouchi Shinko Chemical Industrial Co., Ltd., or Flexsys.

The rubber composition preferably contains stearic acid. The amount of stearic acid per 100 parts by mass of the rubber component is preferably 0.5 to 10 parts by mass, more preferably 1 to 5 parts by mass, in view of the balance of the properties.

The stearic acid may be a conventional one, and examples include products of NOF Corporation, Kao Corporation, Wako Pure Chemical Industries, Ltd., and Chiba Fatty Acid Co., Ltd.

The rubber composition preferably contains zinc oxide. The amount of zinc oxide per 100 parts by mass of the rubber component is preferably 0.5 to 10 parts by mass, more preferably 1 to 5 parts by mass, in view of the balance of the properties.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd. and Sakai Chemical Industry Co., Ltd.

The rubber composition preferably contains sulfur. The amount of sulfur per 100 parts by mass of the rubber component is preferably 0.5 to 10 parts by mass, more preferably 1 to 5 parts by mass, still more preferably 1 to 3 parts by mass, in view of the balance of the properties.

Examples of the sulfur include those used commonly in the rubber industry, such as powdered sulfur, precipitated sulfur, colloidal sulfur, insoluble sulfur, highly dispersible sulfur, and soluble sulfur. These types of sulfur may be used alone, or two or more of these may be used in combination.

The sulfur may be a product of, for example, Tsurumi Chemical Industry Co., Ltd., Karuizawa sulfur Co., Ltd., Shikoku Chemicals Corporation, Flexsys, Nippon Kanryu Industry Co., Ltd., or Hosoi Chemical Industry Co., Ltd.

The rubber composition preferably contains a vulcanization accelerator.

The amount of the vulcanization accelerator per 100 parts by mass of the rubber component is preferably 1 to 10 parts by mass, more preferably 3 to 7 parts by mass, in view of the balance of the properties.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-di-isopropyl-2-benzothiazole sulfenamide; and guanidine vulcanization accelerators such as diphenylguanidine, diorthotolylguanidine, and orthotolylbiguanidine. These vulcanization accelerators may be used alone, or two or more of these may be used in combination. Among these, sulfenamide vulcanization accelerators or guanidine vulcanization accelerators are preferred in view of the balance of the properties.

The rubber composition of the present invention may be prepared by common methods. Specifically, for example, the rubber composition may be prepared by kneading the components using a Banbury mixer, a kneader, an open roll mill, or other kneading machines, and then vulcanizing the kneaded mixture.

The kneading conditions during the base kneading step which involves kneading additives other than vulcanizing agents and vulcanization accelerators include a kneading temperature of usually 50 to 200° C., preferably 80 to 190° C. and a kneading time of usually 30 seconds to 30 minutes, preferably one minute to 30 minutes. The kneading conditions during the final kneading step which involves kneading with vulcanizing agents and/or vulcanization accelerators include a kneading temperature of usually 100° C. or lower, preferably of from room temperature to 80° C. The rubber composition obtained after kneading with vulcanizing agents and/or vulcanization accelerators is usually vulcanized by, for example, press vulcanization. The vulcanization temperature is usually 120 to 200° C., preferably 140 to 180° C.

The rubber composition of the present invention is suitable for treads (cap treads) but may also be used in tire components other than treads, such as sidewalls, base treads, undertreads, clinch apexes, bead apexes, breaker cushions, carcass cord topping rubbers, insulations, chafers, or innerliners, or in side reinforcing layers of run-flat tires.

The pneumatic tire of the present invention may be produced using the rubber composition by conventional methods.

Specifically, the pneumatic tire may be produced by extruding the unvulcanized rubber composition containing the components into the shape of a tire component such as a tread, assembling it with other tire components on a tire building machine in a usual manner to build an unvulcanized tire, and heat pressing the unvulcanized tire in a vulcanizer.

The pneumatic tire of the present invention can be used for passenger vehicles, heavy load vehicles, or other vehicles. In particular, the pneumatic tire is suitable as a tire for heavy load vehicles (tire for trucks and buses) in which a large amount of isoprene-based rubber is incorporated.

EXAMPLES

The present invention is specifically described with reference to examples, but is not limited thereto.

The chemicals used in the examples are listed below.

IR: Nipol IR2200 available from Zeon Corporation

Low molecular weight BR 1: BR360B (cis content: 98% by mass, Mp: 420,000, Mw/Mn: 2.4) available from Ube Industries, Ltd.

Low molecular weight BR 2: BR150B (cis content: 97% by mass, Mp: 330,000, Mw/Mn: 3.3) available from Ube Industries, Ltd.

High molecular weight BR 1: Buna CB21 (cis content: 98% by mass, Mp: 770,000, Mw/Mn: 2.4) available from LANXESS High molecular weight BR 2: BR730 (cis content: 97% by mass, Mp: 580,000, Mw/Mn: 2.39) available from JSR Corporation Carbon black N220: SHOBLACK N220 ($N_2SA$: 114 m$^2$/g) available from Cabot Japan K.K.

Silica: Silica 115Gr ($N_2SA$: 110 m$^2$/g) available from Rhodia Japan

Silane coupling agent: Si266 (bis(3-triethoxysilyl-propyl) disulfide) available from Degussa Wax: Sunnoc wax available from Ouchi Shinko Chemical Industrial Co., Ltd.

Zinc oxide: zinc oxide #2 available from Mitsui Mining and Smelting Co., Ltd.

Stearic acid: "Tsubaki" available from NOF Corporation

Antioxidant 6C: Antioxidant 6C (SANTOFLEX 6PPD) available from Flexsys

Sulfur: powdered sulfur available from Tsurumi Chemical Industry Co., Ltd.

Vulcanization accelerator NS: NOCCELER NS (N-tert-butyl-2-benzothiazolylsulfenamide) available from Ouchi Shinko Chemical Industrial Co., Ltd.

<Polymer Analysis>

Each BR was analyzed as follows.

(Measurement of Molecular Weight Distribution Mw/Mn and Peak Top Molecular Weight Mp)

The molecular weight distribution Mw/Mn and peak top molecular weight Mp of the polymer were determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

EXAMPLES AND COMPARATIVE EXAMPLES

According to each of the formulations indicated in Tables 1 to 3, the materials other than the sulfur and vulcanization accelerator were kneaded in a 1.7 L Banbury mixer (Kobe Steel, Ltd.) at 150° C. for five minutes to give a kneaded mixture. Then, the sulfur and vulcanization accelerator were added to the kneaded mixture, and they were kneaded at 80° C. for three minutes using an open roll mill to obtain an unvulcanized rubber composition. The unvulcanized rubber composition was press-vulcanized at 170° C. for 20 minutes to obtain a vulcanized rubber composition.

The unvulcanized rubber compositions and vulcanized rubber compositions prepared as above were evaluated for processability, tensile strength, fuel economy, and abrasion resistance by the test methods described below. Tables 1 to 3 show the results. In Tables 1 and 2, Comparative Example 1-1 is taken as a reference comparative example; in Table 3, Comparative Example 3-1 is taken as a reference comparative example.

(Processability)

The Mooney viscosity ($ML_{1+4}$/130° C.) of the unvulcanized rubber composition was determined in accordance with JIS K 6300-1 "Rubber, unvulcanized—Physical property—Part 1: Determination of Mooney viscosity and prevulcanization characteristics with Mooney viscometer" using a Mooney viscosity tester as follows. After preheating for one minute to 130° C., a small rotor was rotated at this temperature, and after a lapse of four minutes the Mooney viscosity ($ML_{1+4}$/130° C.) of the unvulcanized rubber composition was measured. The Mooney viscosity values are expressed as an index using the equation below, with the reference comparative example set equal to 100. A higher index indicates a lower Mooney viscosity and better processability.

(Processability index)=(Mooney viscosity of reference comparative example)/(Mooney viscosity of each formulation example)×100

(Tensile Strength)

A No. 3 dumbbell specimen of the vulcanized rubber composition was subjected to a tensile test in accordance with JIS K 6251 to measure the tensile strength at break (TB) and elongation at break (EB) (%). The value TB×EB/2 was defined as the tensile strength. The tensile strength values of the formulation examples are expressed as an index using the equation below, with the reference comparative example set equal to 100. A higher index indicates better tensile strength. Indexes of 95 and higher are acceptable in practice.

(Tensile strength index)=(TB×EB/2 of each formulation example)/(TB×EB/2 of reference comparative example)×100

(Abrasion Resistance)

The abrasion loss of the vulcanized rubber composition was measured using a Lambourn abrasion tester at room temperature, a load of 1.0 kgf, and a slip ratio of 30%. The abrasion loss values are expressed as an index using the equation below.

A higher index indicates better abrasion resistance.

(Abrasion resistance index)=(Abrasion loss of reference comparative example)/(Abrasion loss of each formulation example)×100

(Fuel Economy (Rolling Resistance))

The tan δ of the vulcanized rubber composition was measured using a spectrometer (Ueshima Seisakusho Co., Ltd.) at a dynamic strain amplitude of 1%, a frequency of 10 Hz, and a temperature of 60° C. The tan δ values are expressed as an index using the equation below. A higher index indicates a lower rolling resistance and better fuel economy.

(Fuel economy index)=(tan δ of reference comparative example)/(tan δ of each formulation example)×100

TABLE 1

IR/BR = 80/20 (Carbon black)

|  |  | Example | | | | | | Comparative Example | | | |
|---|---|---|---|---|---|---|---|---|---|---|---|
|  |  | 1-1 | 1-2 | 1-3 | 1-4 | 1-5 | 1-6 | 1-1 | 1-2 | 1-3 | 1-4 |
| Formulation (parts by mass) | IR | 80 | 80 | 80 | 80 | 80 | 80 | 80 | 80 | 80 | 80 |
|  | High molecular weight BR 1 (CB21) | 10 |  | 10 |  | 5 | 15 | 20 |  |  |  |

TABLE 1-continued

IR/BR = 80/20 (Carbon black)

|  |  | Example | | | | | | Comparative Example | | | |
|---|---|---|---|---|---|---|---|---|---|---|---|
|  |  | 1-1 | 1-2 | 1-3 | 1-4 | 1-5 | 1-6 | 1-1 | 1-2 | 1-3 | 1-4 |
|  | High molecular weight BR 2 (BR730) |  | 10 |  | 10 |  |  |  | 20 |  |  |
|  | Low molecular weight BR 1 (BR360B) | 10 | 10 |  |  | 15 | 5 |  |  | 20 |  |
|  | Low molecular weight BR 2 (BR150B) |  |  | 10 | 10 |  |  |  |  |  | 20 |
|  | Carbon black N220 | 50 | 50 | 50 | 50 | 50 | 50 | 50 | 50 | 50 | 50 |
|  | Wax | 1 | 1 | 1 | 1 | 1 | 1 | 1 | 1 | 1 | 1 |
|  | Antioxidant 6C | 1 | 1 | 1 | 1 | 1 | 1 | 1 | 1 | 1 | 1 |
|  | Stearic acid | 2 | 2 | 2 | 2 | 2 | 2 | 2 | 2 | 2 | 2 |
|  | Zinc oxide | 3 | 3 | 3 | 3 | 3 | 3 | 3 | 3 | 3 | 3 |
|  | Sulfur | 1 | 1 | 1 | 1 | 1 | 1 | 1 | 1 | 1 | 1 |
|  | Vulcanization accelerator NS | 1.5 | 1.5 | 1.5 | 1.5 | 1.5 | 1.5 | 1.5 | 1.5 | 1.5 | 1.5 |
| Evaluation | Processability | 110 | 115 | 115 | 120 | 110 | 105 | 100 | 103 | 110 | 115 |
|  | Tensile strength | 110 | 100 | 105 | 100 | 105 | 105 | 100 | 100 | 90 | 85 |
|  | Abrasion resistance | 110 | 100 | 105 | 100 | 105 | 105 | 100 | 98 | 90 | 85 |
|  | Fuel economy | 110 | 100 | 105 | 100 | 105 | 105 | 100 | 98 | 90 | 85 |

TABLE 2

IR/BR = 70/30 (Carbon black)

|  |  | Example | | | | | | Comparative Example | | | |
|---|---|---|---|---|---|---|---|---|---|---|---|
|  |  | 2-1 | 2-2 | 2-3 | 2-4 | 2-5 | 2-6 | 2-1 | 2-2 | 2-3 | 2-4 |
| Formulation (parts by mass) | IR | 70 | 70 | 70 | 70 | 70 | 70 | 70 | 70 | 70 | 70 |
|  | High molecular weight BR 1 (CB21) | 15 |  | 15 |  | 10 | 20 | 30 |  |  |  |
|  | High molecular weight BR 2 (BR730) |  | 15 |  | 15 |  |  |  | 30 |  |  |
|  | Low molecular weight BR 1 (BR360B) | 15 | 15 |  |  | 20 | 10 |  |  | 30 |  |
|  | Low molecular weight BR 2 (BR150B) |  |  | 15 | 15 |  |  |  |  |  | 30 |
|  | Carbon black N220 | 50 | 50 | 50 | 50 | 50 | 50 | 50 | 50 | 50 | 50 |
|  | Wax | 1 | 1 | 1 | 1 | 1 | 1 | 1 | 1 | 1 | 1 |
|  | Antioxidant 6C | 1 | 1 | 1 | 1 | 1 | 1 | 1 | 1 | 1 | 1 |
|  | Stearic acid | 2 | 2 | 2 | 2 | 2 | 2 | 2 | 2 | 2 | 2 |
|  | Zinc oxide | 3 | 3 | 3 | 3 | 3 | 3 | 3 | 3 | 3 | 3 |
|  | Sulfur | 1 | 1 | 1 | 1 | 1 | 1 | 1 | 1 | 1 | 1 |
|  | Vulcanization accelerator NS | 1.5 | 1.5 | 1.5 | 1.5 | 1.5 | 1.5 | 1.5 | 1.5 | 1.5 | 1.5 |
| Evaluation | Processability | 120 | 125 | 125 | 130 | 120 | 120 | 110 | 115 | 120 | 125 |
|  | Tensile strength | 110 | 100 | 100 | 95 | 110 | 110 | 90 | 88 | 85 | 80 |
|  | Abrasion resistance | 120 | 115 | 115 | 110 | 115 | 115 | 110 | 105 | 95 | 85 |
|  | Fuel economy | 110 | 105 | 105 | 100 | 100 | 100 | 90 | 85 | 80 | 75 |

TABLE 3

IR/BR = 70/30 (Silica)

|  |  | Example 3-1 | Comparative Example 3-1 |
|---|---|---|---|
| Formulation (parts by mass) | IR | 70 | 70 |
|  | Low molecular weight BR 1 (BR360B) | 15 |  |
|  | Low molecular weight BR 2 (BR150B) |  |  |
|  | High molecular weight BR 1 (CB21) | 15 | 30 |
|  | High molecular weight BR 2 (BR730) |  |  |
|  | Carbon black N220 | 5 | 5 |
|  | Silica | 50 | 50 |
|  | Silane coupling agent | 5 | 5 |
|  | Wax | 1 | 1 |
|  | Antioxidant 6C | 1 | 1 |
|  | Stearic acid | 2 | 2 |
|  | Zinc oxide | 3 | 3 |
|  | Sulfur | 1 | 1 |
|  | Vulcanization accelerator NS | 1.5 | 1.5 |
| Evaluation | Processability | 100 | 100 |
|  | Tensile strength | 110 | 100 |
|  | Abrasion resistance | 110 | 100 |
|  | Fuel economy | 110 | 100 |

As shown in Tables 1 to 3, the rubber compositions of the examples which contained predetermined amounts of an isoprene-based rubber and a polybutadiene rubber mixture consisting of a specific high cis, high molecular weight polybutadiene rubber and a specific high cis, low molecular weight polybutadiene rubber exhibited good processability, tensile strength, abrasion resistance, and fuel economy while maintaining a good balance between them. Moreover, comparison of Example 1-1 with Comparative Examples 1-1 and 1-3, for example, demonstrates that the combination of the high molecular weight BR and low molecular weight BR provided a synergistically improved balance of tensile strength, abrasion resistance, and fuel economy while achieving good processability.

The invention claimed is:

1. A pneumatic tire, comprising a tread formed from a rubber composition for tires, the rubber composition comprising:
    an isoprene-based rubber;
    a polybutadiene rubber mixture consisting of a high molecular weight polybutadiene rubber having a cis content of 95% by mass or more and a peak top molecular weight Mp of 550,000 or more and a low molecular weight polybutadiene rubber having a cis content of 95% by mass or more and a peak top molecular weight Mp of 500,000 or less; and
    carbon black having a nitrogen adsorption specific surface area of 80 $m^2/g$ or more,
    a rubber component in the rubber composition including, based on 100% by mass thereof, 60 to 90% by mass of the isoprene-based rubber and 10 to 40% by mass of the polybutadiene rubber mixture, 5 to 20% by mass of the high molecular weight polybutadiene rubber and 5 to 20% by mass of the low molecular weight polybutadiene rubber.

2. The pneumatic tire according to claim 1,
    wherein the rubber composition comprises 20 to 80 parts by mass of carbon black per 100 parts by mass of the rubber component.

3. The pneumatic tire according to claim 1,
    wherein the rubber component in the rubber composition includes, based on 100% by mass thereof, 70 to 80% by mass of the isoprene-based rubber and 20 to 30% by mass of the polybutadiene rubber mixture.

4. The pneumatic tire according to claim 1,
    wherein the high molecular weight polybutadiene rubber has the peak top molecular weight Mp of 550,000 to 900,000 and the low molecular weight polybutadiene rubber has the peak top molecular weight Mp of 300,000 to 450,000.

5. The pneumatic tire according to claim 1,
    wherein the rubber component in the rubber composition includes, based on 100% by mass thereof, 70 to 80% by mass of the isoprene-based rubber and 20 to 30% by mass of the polybutadiene rubber mixture, and
    wherein the high molecular weight polybutadiene rubber has the peak top molecular weight Mp of 550,000 to 900,000 and the low molecular weight polybutadiene rubber has the peak top molecular weight Mp of 300,000 to 450,000.

* * * * *